May 17, 1932.   C. B. SPASE   1,858,312
CLUTCH PLATE
Filed Oct. 23, 1931

INVENTOR.
Charles B. Spase
BY
Fay, Oberlin & Fay
ATTORNEYS

Patented May 17, 1932

1,858,312

UNITED STATES PATENT OFFICE

CHARLES B. SPASE, OF SYRACUSE, NEW YORK, ASSIGNOR TO IRA SAKS, OF CLEVELAND, OHIO

CLUTCH PLATE

Application filed October 23, 1931. Serial No. 570,539.

The present invention relating as indicated to a clutch plate has more particular reference to a novel form of construction for a dual or opposed disc cushion plate as utilized in present day automotive practice. It is the function of the clutch plate or disc to be frictionally engaged between two aligned rotating members, usually the fly wheel and pressure plate, and to intermittently transmit torque therebetween. It is the fundamental object of my present invention to provide such a clutch or transmission plate which will perform its frictional engagement function with a smooth and even action, in order that the torque may be more gradually transmitted between the moving parts, thus preventing the damage of excessive strain and premature failure of said parts.

It is the further object to so construct the clutch plate in order to eliminate the presence of weak spots at those points which are subjected to maximum alternate stress, and to correspondingly render the clutch discs less susceptible to fatigue failure. To the accomplishment of the foregoing and related ends, said invention, then, consists of the means hereinafter fully described and particularly pointed out in the claims.

Figure 1:
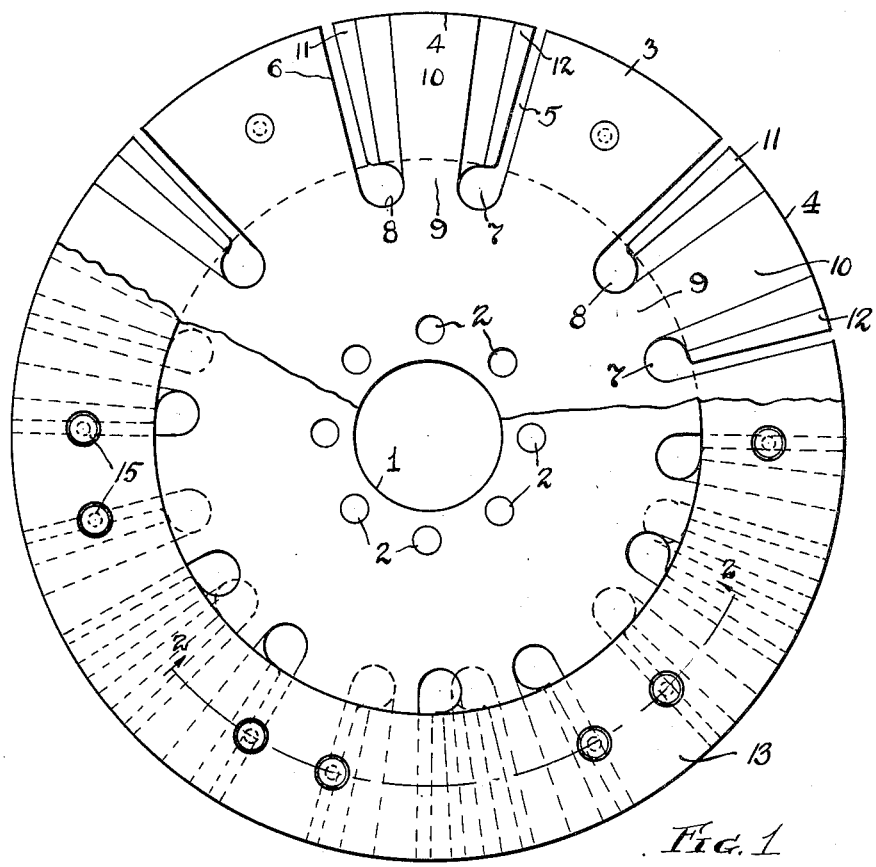
Figure 2:
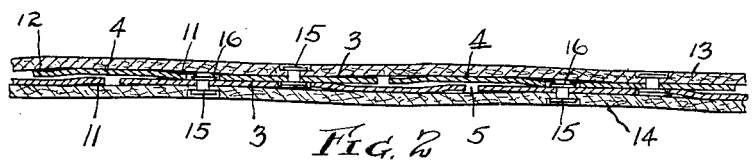
Figure 3:
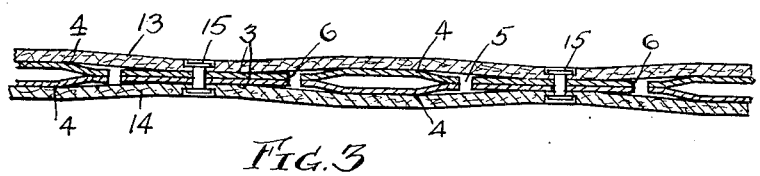

The annexed drawings and the following description set forth in detail certain structure embodying the invention, such disclosed means constituting, however, but one of various structural forms in which the principle of the invention may be used:

In said annexed drawings:

Fig. 1 is a plan view with a part of the facing ring removed of the clutch plate embodying the principle of my invention. Fig. 2 is a section taken substantially upon the arcuate line 2—2 of Fig. 1. Fig. 3 is an arcuate section similar to Fig. 2 but illustrative of an alternative form of construction.

Referring more particularly to the drawings the clutch plate consists of a pair of metallic discs having the central openings 1 for the reception of a hub or spline (not shown) which may be suitably riveted, bolted or welded to said discs through the concentrically disposed holes 2. The outer portions of the discs are found to be in the form of a series of alternate flat and offset peripheral sectors 3 and 4 respectively. The sectors 3 and 4 are separated from each other by means of a series of radial slots 5 and 6 terminating in the tangential circular openings 7 and 8 respectively. The latter openings 7 and 8 extend toward each other at points bordering the offset sectors 4, so that said offset sectors 4 will be joined to the body of the discs by a narrow section 9. The offset sectors 4 have the central flat portions 10 bordered by the inwardly bent marginal portions 11 and 12. The dual discs are so arranged in relation to each other that the offset sectors 4 of one disc overlap and contact with an offset and a flat sector of the other disc, with the marginal flat sections 11 and 12 making a metal to metal contact with sectors of the opposed disc.

Friction facing rings 13 and 14 are then riveted to the flat sectors 3. It will thus be seen that there occurs a series of alternate high and low spots throughout the engaging surfaces of the friction facing rings 13 and 14. These high and low spots serve the highly desirable function of effecting a non-vibrational initial engagement of the clutch plate. Upon complete or full pressure engagement of the clutch parts the offset sectors will be substantially flattened out so that the entire surface of the friction facing rings will be in frictional engagement with the driving and driven members of the clutch mechanism. Since the offset sectors 4 are therefore subjected to the repetition of alternate bending stresses during the intermittent engagement of the clutch parts, it is obvious that the opportunities for fatigue failure will be greatest at points of maximum metallic fibre stress, that is, where the sectors join the body of the disc. Therefore, the circular openings 7 and 8 have been placed at points contiguous to these regions of maximum fibre stress in order to prevent the inception of fatigue cracks into the body of the disc. The presence of the circular openings 7 and 8 may be explained upon a theory analogous to that justifying the presence of fillets in machine construction, viz.: The fibre stresses at points subjected to maximum strain tend to become concentrated at the surface of the metal. Therefore, by reason of increasing the area of these points of surface stresses concentration, the fibre stress per unit area is accordingly decreased.

In Fig. 3 I have shown an alternative form of construction in which like sectors are placed in registry with each other. In this latter form of construction the friction facing rings 13 and 14 are likewise riveted to the flat sectors 3 by the rivets 15 passing through both of the steel discs and through both of the facing rings with the resultant advantage of doubling the rivet fastenings in both facings and using the friction material as a reenforcement means for conforming the opposed offset sectors 4, as well as providing a wide flat surface for strengthening the rivet fastenings.

It should be further noted that in both forms of construction shown in Figs. 2 and 3 respectively, the opposed sectors have metal to metal contact with each other and do not bear against the friction facing rings on the opposed disc, with the result that the friction material is not subjected to any cutting or damaging action from projecting metallic parts of the discs. The facing rings 13 and 14 are further protected against any damaging action by means of the clearance holes 16 which are provided in the opposing disc for the heads of the rivets, as shown in the form of construction illustrated in Fig. 2.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A clutch plate having a plurality of alternate flat and laterally offset peripheral sectors, radially extending slots positioned between said sectors, circular enlargements tangential to the inner ends of said slots.

2. A clutch plate having a plurality of alternate flat and laterally offset peripheral sectors, radially extending slots positioned between said sectors, circular enlargements tangential to the inner ends of said slots, the said circular openings in the slots bordering said offset sectors extending towards each other.

3. A clutch plate having a plurality of alternate flat and laterally offset peripheral sectors, radially extending slots positioned between said sectors, circular enlargements tangential to the inner ends of said slots, and central flat portions in said offset sectors.

4. A clutch plate having a pair of discs, a plurality of alternate flat and offset peripheral sectors on each of said discs, radially extending slots between said sectors, circular enlargements tangential to the inner ends of said slots, and friction facing rings secured to said flat sectors.

5. A clutch plate having a pair of discs, a plurality of alternate flat and offset peripheral sectors on each of said discs, radially extending slots between said sectors, the center of the sectors in one disc being aligned with the slots in the other disc, circular enlargements tangential to the inner ends of said slots, and friction facing rings secured to said flat sectors.

6. A clutch plate having a pair of discs, a plurality of alternate flat and offset peripheral sectors on each of said discs, radially extending slots between said sectors, inwardly extending flat sections on the radial margins of said offset sectors, circular enlargements tangential to the inner ends of said slots, and friction facing rings secured to said flat sectors.

7. A clutch plate having a pair of discs, a plurality of alternate flat and offset peripheral sectors on each of said discs, radially extending slots between said sectors, inwardly extending flat sections on the radial margins of said offset sectors, said marginal flat sections being adapted to contact with the inner surfaces of said flat sectors and said offset sectors respectively of the opposed disc, circular enlargements tangential to the inner ends of said slots, and friction facing rings secured to said flat sectors.

8. A clutch plate having a pair of discs, a plurality of alternate flat and offset peripheral sectors on each of said discs, radially extending slots between said sectors, circular enlargements tangential to the inner ends of said slots, said circular openings in the slots bordering said offset sectors extending towards each other.

9. A clutch plate having a pair of discs, a plurality of alternate flat and offset peripheral sectors on each of said discs, radially extending slots between said sectors, said sectors and slots of one disc being in registry with the sectors and slots of the other disc, circular enlargements tangential to the inner ends of said slots, and friction facing rings secured to said flat sectors.

Signed by me this 20 day of October, 1931.

CHARLES B. SPASE.